(12) United States Patent
Slemp et al.

(10) Patent No.: US 7,725,274 B2
(45) Date of Patent: May 25, 2010

(54) METHOD AND APPARATUS FOR IDENTIFYING A REGION OF INTEREST OF TRANSIENT VIBRATION DATA REQUIRING ANALYSIS

(75) Inventors: Mark William Slemp, Knoxville, TX (US); Joseph A. Vrba, Clinton, TN (US); Leanne Tuggle Metzger, Lenoir City, TN (US); Michael David Rich, Powell, TN (US)

(73) Assignee: CSI Technology, Inc., Wilmington, DE (US)

( * ) Notice: Subject to any disclaimer, the term of this patent is extended or adjusted under 35 U.S.C. 154(b) by 875 days.

(21) Appl. No.: 11/381,836

(22) Filed: May 5, 2006

(65) Prior Publication Data

US 2008/0221811 A1 Sep. 11, 2008

(51) Int. Cl.
  *G01N 11/00* (2006.01)
  *G01R 29/26* (2006.01)
(52) U.S. Cl. .......................................... 702/56; 702/69
(58) Field of Classification Search .................. 702/56, 702/66, 67, 69, 68, 96, 142; 345/440, 530, 345/676; 707/1, 3; 324/620
See application file for complete search history.

(56) References Cited

U.S. PATENT DOCUMENTS

| 4,804,921 | A | * | 2/1989 | Putrow et al. ................ 324/394 |
| 4,980,844 | A | | 12/1990 | Demjanenko |
| 5,602,761 | A | | 2/1997 | Spoerre et al. |
| 5,663,864 | A | | 9/1997 | Tanaka et al. |
| 5,698,788 | A | | 12/1997 | Mol et al. |
| 5,943,634 | A | | 8/1999 | Piety et al. |
| 5,959,479 | A | * | 9/1999 | Woodward .................. 327/160 |
| 6,199,018 | B1 | * | 3/2001 | Quist et al. .................... 702/34 |
| 6,484,109 | B1 | | 11/2002 | Lofall |
| 6,591,682 | B1 | | 7/2003 | Lysen |
| 6,701,286 | B2 | | 3/2004 | Kauppila |
| 6,845,340 | B2 | | 1/2005 | Edie et al. |

FOREIGN PATENT DOCUMENTS

| WO | 8500455 | 1/1985 |
| WO | 9710491 | 3/1997 |

* cited by examiner

*Primary Examiner*—Michael P Nghiem
(74) *Attorney, Agent, or Firm*—Luedeka, Neely & Graham, P.C.

(57) ABSTRACT

A method and apparatus identifies a region of interest of transient vibration data needing analysis and provides context and construction for analytical plots. The method provides transient data, determines a region of interest of the transient data, specifies a construction mode corresponding to a derived graphical display of the transient data, and specifies one or more construction parameters corresponding to the specified construction mode. The method also processes the transient data to produce at least one derived plot based on the transient data, the region of interest, the specified construction mode, and the specified construction parameters. This method may be performed by a graphical tool having a hardware module and a software module. The hardware module including a processor, a memory, a display, and a communicator, and the software module including a plotting module and a plot control module.

4 Claims, 12 Drawing Sheets

METHOD AND APPARATUS FOR IDENTIFYING A REGION OF INTEREST OF TRANSIENT VIBRATION DATA REQUIRING ANALYSIS

FIELD

The present invention relates to the field of machine vibration analysis. More particularly, it relates to a method and apparatus for identifying a region of interest of transient vibration data requiring analysis.

BACKGROUND AND SUMMARY

Historically, vibration data analysis in evaluating machinery health is a daunting task. First, only relevant sections of the vibration data require analysis. It may be desirable in some limited cases to analyze steady-state vibration data in order to confirm a minimal level of vibration. However, the relevant sections generally are the transient vibration data sections. Unfortunately, the volume of transient vibration data available for analysis may be unmanageable. For example. one transient analysis system can collect 32 channels of vibration data 5,120 times per second for over 48 hours. An effective analysis of data collected from such a system may necessitate analysis of a single, continuous time waveform containing over 800 million data points.

In order for such a data waveform to be analyzed sufficiently, it must be broken into smaller components or regions. Several different processing methods for sections of vibration data may be used in order to provide diagnostic benefits beyond viewing conventional waveforms and trend data (spectral-based parameter data plotted against time). Also, the different processing methods provide several display opportunities not available with plotted waveforms and trends. The processing and display methods available for vibration analysis include cascade/waterfall plots, average shaft centerline plots and Bode/Nyquist plots.

In order to effectively use the vibration analysis plotting tools discussed above, a user must be able to provide a data context for these alternative displays—that is, to identify the portion of the data to be processed. Additionally, parameters used to construct the plots must also be specified. For these reasons, a method and graphical tool to help users identify the portion of the transient data requiring analysis is needed. Also, construction parameters associated with the graphical tool are needed to help determine how the portion of transient data is sampled in order to populate any derived analysis plots including cascade/waterfall plots, average shaft centerline plots and Bode/Nyquist plots.

A method and apparatus for identifying a region of interest of transient vibration data requiring analysis solves the aforementioned and other problems. In one method for processing and displaying data, transient data is provided and a region of interest leading edge and trailing edge are determined, which together define the portion of transient data requiring analysis. A construction mode is specified corresponding to a derived graphical display of the transient data, and a construction parameter is also specified corresponding to the specified construction mode. The transient data is processed to produce at least one derived plot. The construction mode may be selected from; delta time construction mode, delta rpm construction mode, and fixed number construction mode. The derived plot may be selected from; cascade plots, average shaft centerline plots, and Bode/Nyquist plots.

In one embodiment, a graphical tool is provided for identifying a region of interest representing transient data chosen by a user. The graphical tool also derives and displays an analytical plot from the region of interest. The transient data is collected by a vibration sensing instrument and represents the vibration of a machine, and the transient data is communicated to the graphical tool by the vibration sensing instrument. The graphical tool may include a hardware module and a software module. The hardware module has a processor, a memory, a display, and a communicator. The memory is connected to the processor and stores the software module. The display is also connected to the processor and displays the transient data, the region of interest, and the analytical plots. The communicator is connected to the processor and communicates with the vibration sensing instrument. The software module has a plotting module and a plotcontrol module having a tools module containing tools used by the plotting module.

BRIEF DESCRIPTION OF THE DRAWINGS

The preferred embodiments of the invention will now be described in further detail with reference to the drawings wherein like reference characters designate like or similar elements throughout the several drawings as follows.

DETAILED DESCRIPTION

The following paragraphs disclose a method for identifying a region of interest of transient machine vibration data facilitating analysis using context and construction parameters for analytical plots.

Figure 1A:
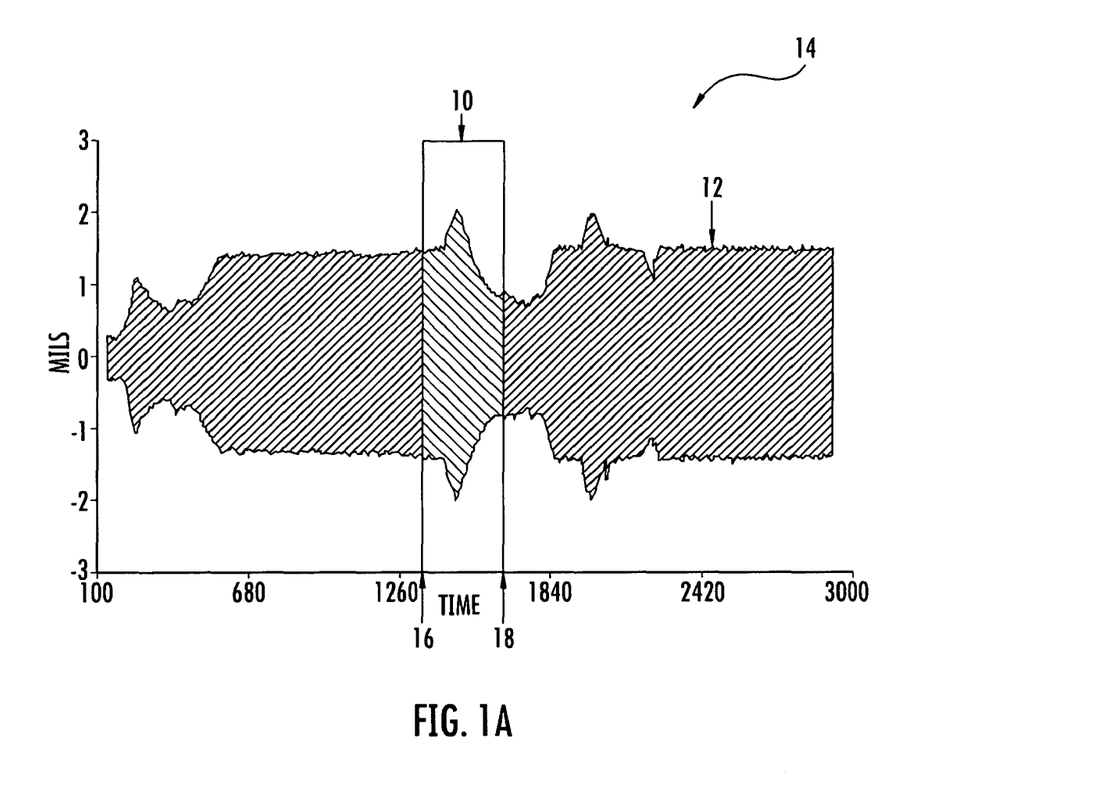
FIG. 1A is a screenshot of the display of a region of interest of an envelope of vibration time data.

Referring now to FIG. 1A, a screenshot of the region of interest 10 of a collection of time-series vibration data 12 is shown. Such time-series vibration data 12 may result from a variety of sources including machine vibration. Furthermore, time-series vibration data 12 may be collected in several ways including collection by vibration transducers. The time-series vibration data 12 is communicated to a computer or other processing device where it is graphically displayed as the dependent variable versus the independent variable—such as time as shown in FIG. 1A. This graphical tool 14 allows a user to visually inspect the time-series vibration data 12 over a specified period of time in order to determine the areas where data analysis may be necessary. Alternatively, tachometer data may be collected by a tachometer and communicated to the computer or other processing device where it is graphically displayed by the graphical tool 14.

The region of interest 10 is positioned by a user in order to provide context for displays derived from the transient waveform and transient trend data such as cascade or waterfall, average shaft centerline and Bode/Nyquist displays. The user chooses a leading edge 16 for the region of interest 10 by using the graphical tool 14. The leading edge 16 of the region of interest 10 provides the starting time for the data to be used to derive analytical plots such as those discussed above. The user also chooses a trailing edge 18 for the region of interest 10 using the graphical tool 14. The trailing edge 18 provides the ending time for the data to be used to derive analytical plots.

Figure 1B:
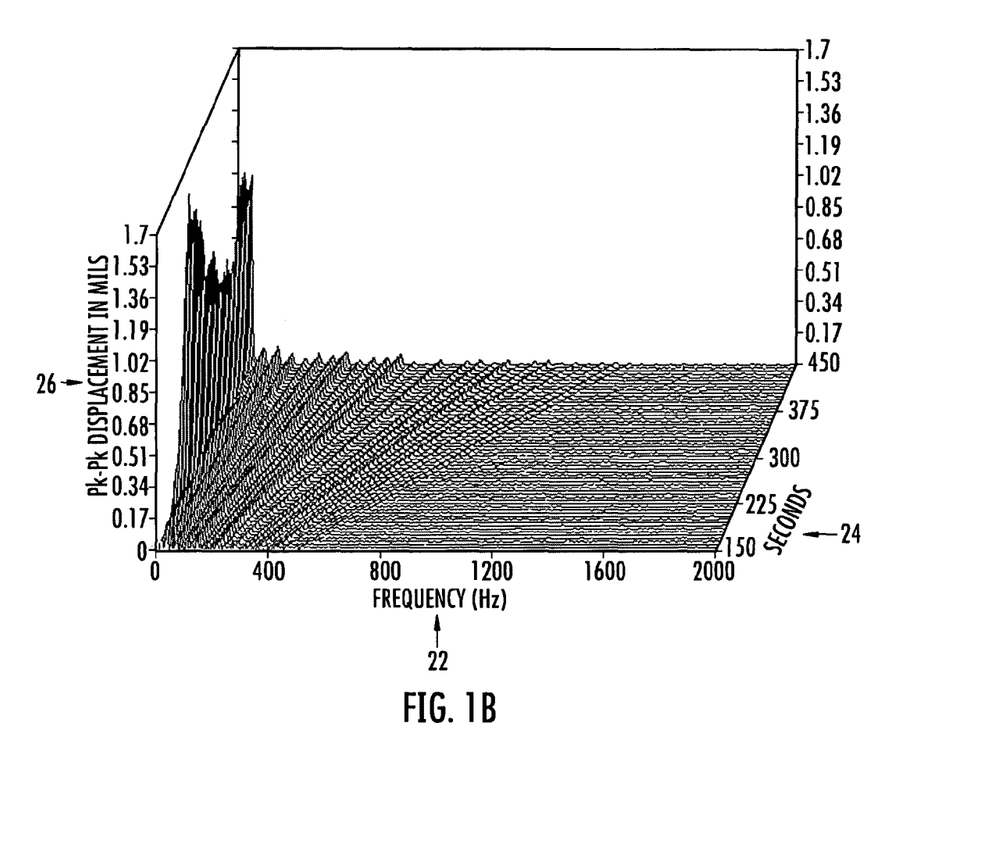
FIG. 1B is a screenshot of the display of a cascade or waterfall plot representing the region of interest shown in FIG. 1A.
Figure 1C:
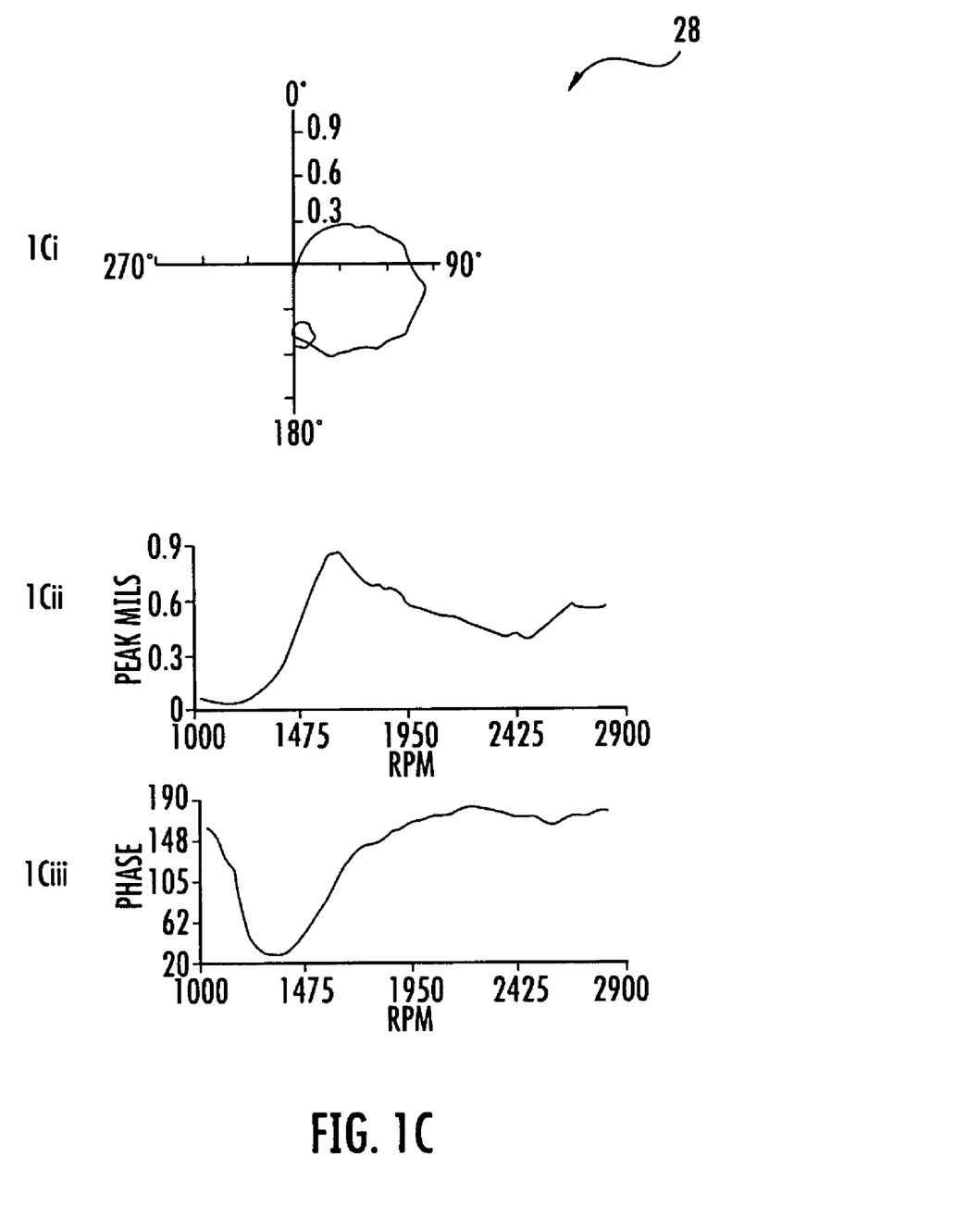
FIG. 1C is a screenshot of the display of a Bode/Nyquist plot representing the region of interest shown in FIG. 1A.

The user selects the region of interest 10 by visually inspecting the vibration data 12 in search of a section of transient data and chooses a leading edge 16 and a trailing edge 18, which together surround the section of transient data chosen. The user also chooses settings 35 (FIG. 3) associated with the derived plots. Alternatively, the user may select the region of interest 10 after having chosen settings 35. Once such settings 35 are chosen as discussed below, plots such as those shown in FIGS. 1B and 1C are derived by the graphical tool 14. FIG. 1B shows a cascade plot 20 depicting spectra versus machine speed, which is represented by z-axis 24 of FIG. 1B. A graph similar to that shown in FIG. 1B, but wherein the z-axis 24 represents time is a waterfall plot. In other words, a waterfall plot shows spectra versus time. The cascade plot 20 is a three dimensional derivation of the region of interest 10 in the frequency domain, which is represented by the x-axis 22, with respect to vibration amplitude, which is represented by the v-axis 26. FIG. 1C shows a Bode/Nyquist plot derived from the region of interest 10 shown in FIG. 1A. The Bode plots, on the lower half of FIG. 1C, show peak vibration amplitude at a particular frequency versus machine speed (FIG. 1Cii) and also show phase of the same peak vibration versus machine speed (FIG. 1Ciii). The Nyquist plot, on the upper half of FIG. 1C, shows peak vibration amplitude at a particular frequency along with associated phase in a polar display (FIG. 1Ci).

Figure 2A:
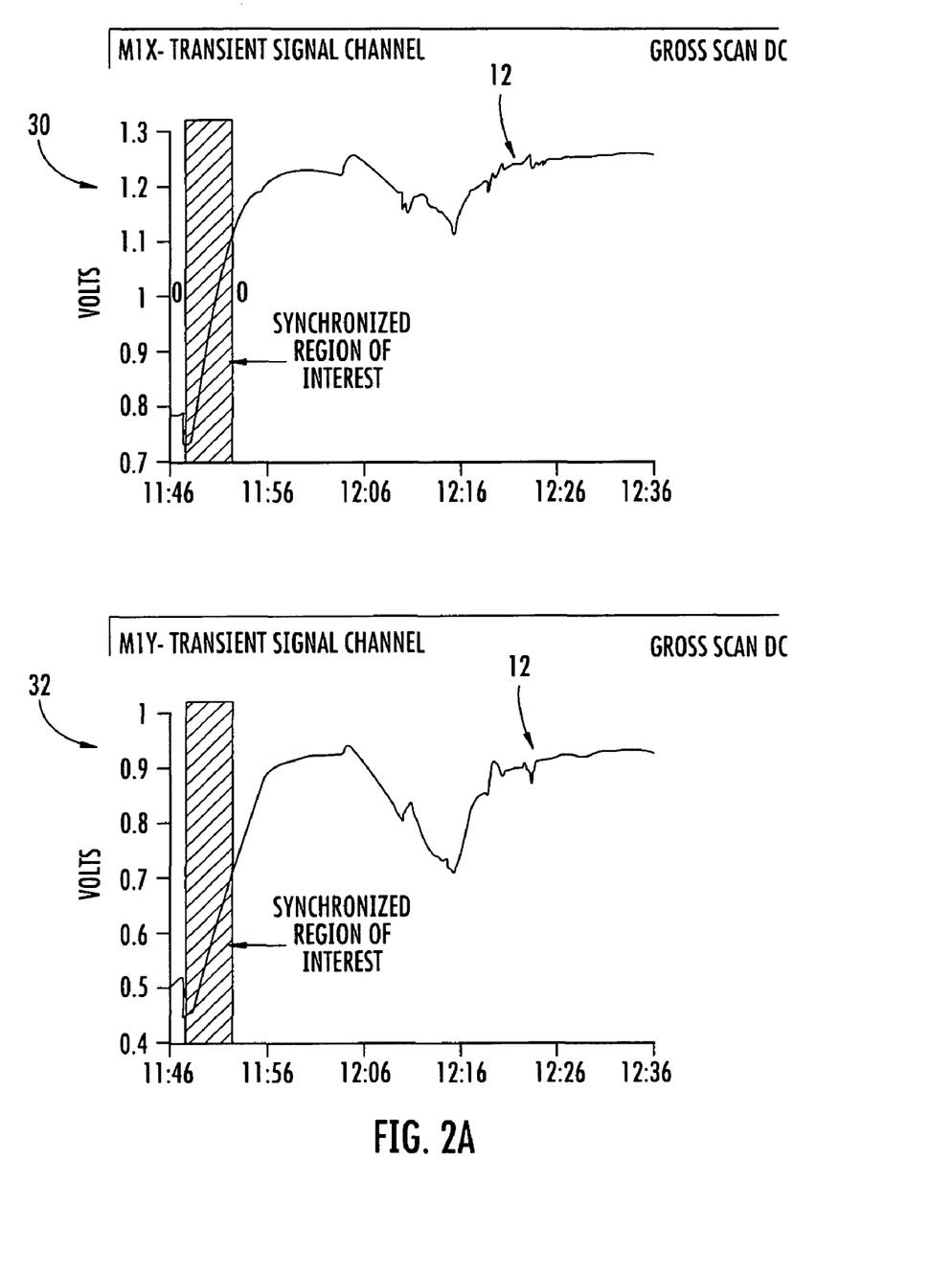
FIG. 2A is a screenshot of a display of two regions of interest synchronized with one another.
Figure 6:
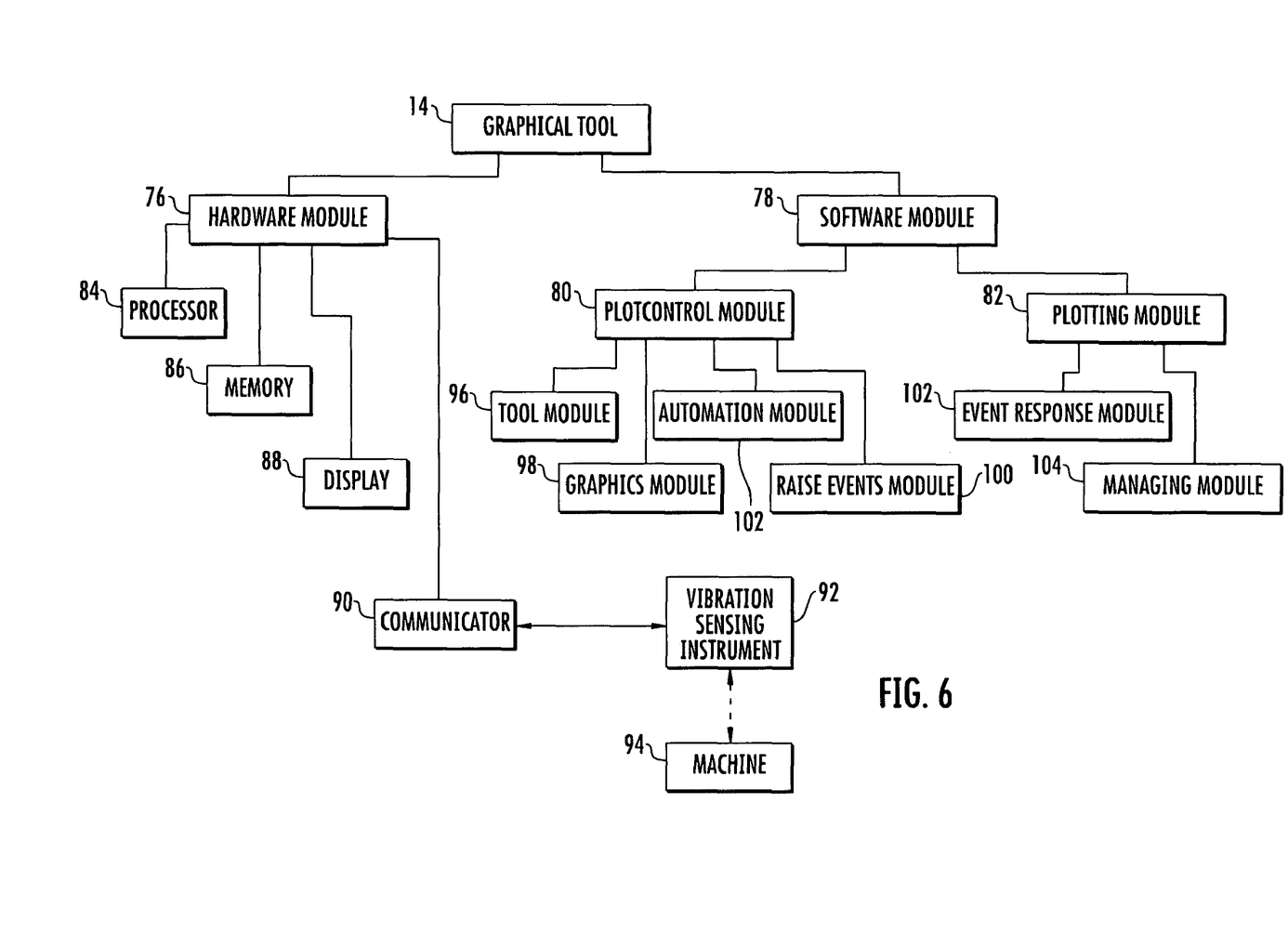
FIG. 6 is a diagram of the graphical tool including the hardware module and its components and the software module and its components with the hardware module connected to the vibration sensing instrument.

Referring now to FIG. 2A, two transient signal channels 30 and 32 are shown. The user may select to display the data from two channels simultaneously in the graphical tool 14. If the vibration data 12 collected on the two channels 30 and 32 had been collected simultaneously (or nearly so), the graphical tool 14 will automatically synchronize the regions of interest 10 for comparative analysis In the embodiment shown in FIG. 2B, an average shaft centerline plot 34 is shown. The average shaft centerline plot 34 is calculated from the vibration data 12 collected simultaneously (or nearly so) on channels 30 and 32, contained within the synchronized regions of interest 10 shown in FIG. 2A. The average shaft centerline plot 34 may be calculated from the vibration data 12 from channels 30 and 32 stored in the memory 86 of the hardware module 76 for subsequent analysis (FIG. 6). Alternatively, the average shaft centerline plot 34 may be calculated from the vibration data 12 collected on channels 30 and 32 for real-time analysis.

Figure 2B:
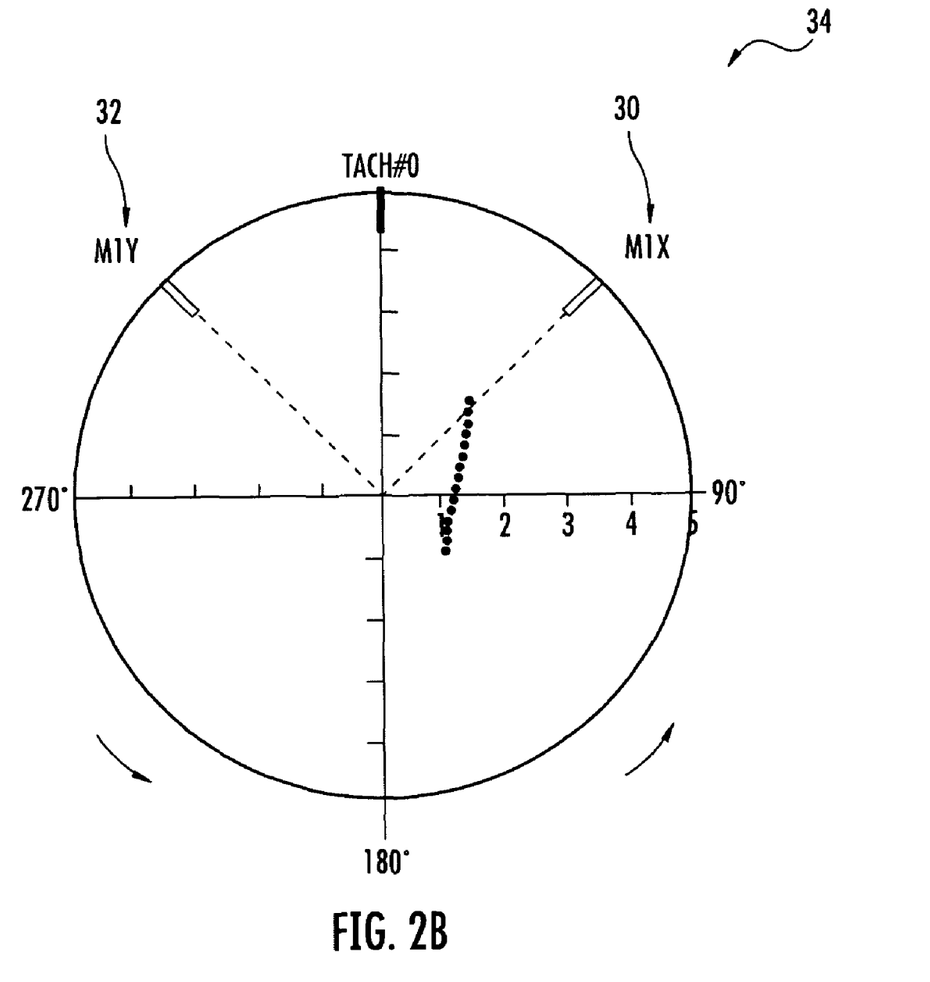
FIG. 2B is a screenshot of a display of an average shaft centerline plot representing the region of interest shown in FIG. 1A.
Figure 3A:
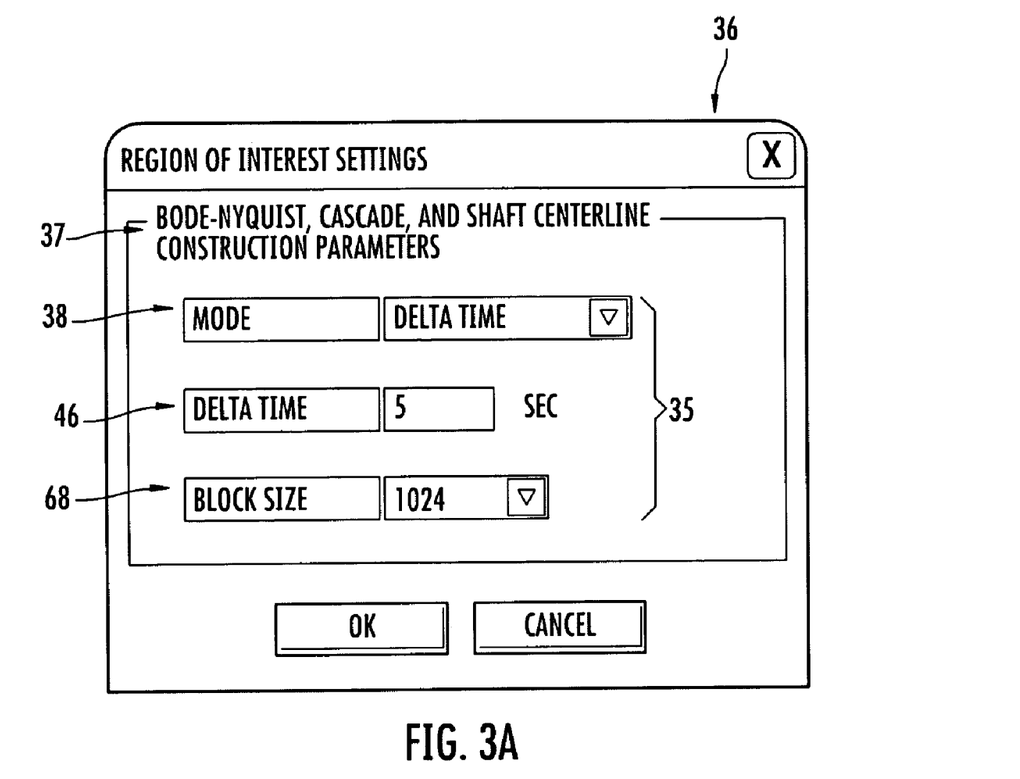
FIG. 3A is a screenshot of the display of the settings dialogue.

The average shaft centerline plot 34 shown in FIG. 2B may be populated in real time as data is collected over the region of interest 10 of the two channels 30 and 32. That is, as the vibration data 12 is collected, or as soon thereafter as a user can choose the leading edge 16 and trailing edge 18 of the region of interest 10 and the settings 35 (FIG. 3), the average shaft centerline plot 34 may be created.

Figure 3B:
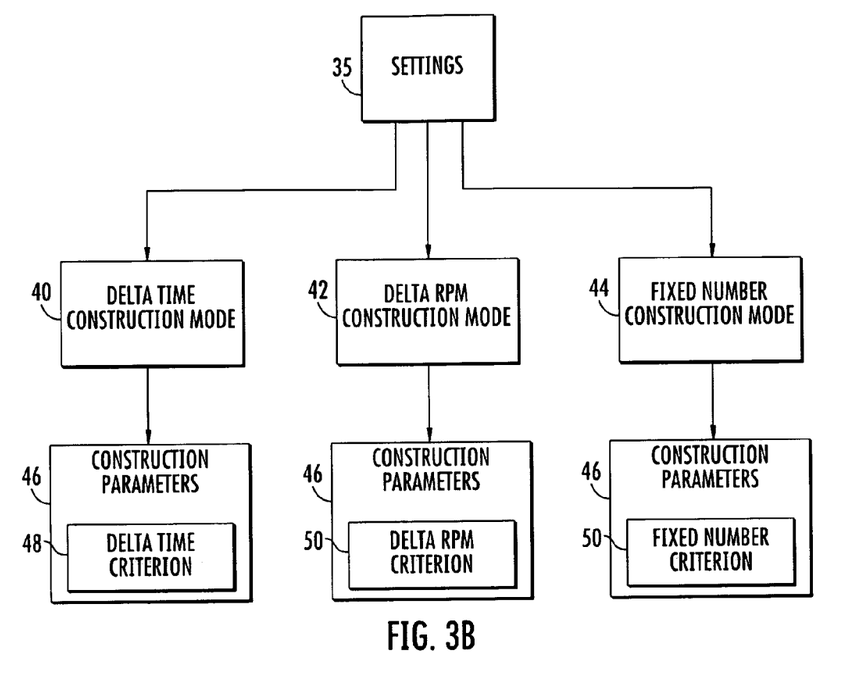
FIG. 3B is a diagram of the settings including construction modes and associated construction parameters.

Referring now to FIGS. 3A and 3B, the settings dialog 36 and a flowchart representing the selection of settings by a user are shown. In this embodiment of the graphical tool 14, Bode/Nyquist 28, cascade 20, and average shaft centerline 34 plots are available as illustrated by the header 37. In order to program the graphical tool 14 to use the region of interest 10 of a collection of vibration data 12 in analysis, a user initially must choose several settings 35 from the settings dialog 36. First, the user must select a construction mode 38 from the group of delta time construction mode 40, delta rpm construction mode 42, and fixed number construction mode 44. In FIG. 3A, the delta time construction mode 40 has been selected.

Once the construction mode 38 has been selected, the user must determine construction parameters 46 associated with the selected construction mode 38. The construction parameters 46 may include only one criterion or in other embodiments may include several criteria. If delta time construction mode 40 is the selected construction mode 38, the delta time criterion 48 construction parameter 46 must be selected. In the figure, a time of 5 seconds has been chosen as the delta time criterion 46. The delta time criterion 46 is a time value which the graphical tool 14 uses to step through the vibration data 12 from the leading edge 16 of the region of interest 10 to the trailing edge 18 of the region of interest 10 in its analysis. Each step 54 (FIG. 4A) has a time width equal to the value of the delta time criterion 48.

Referring back to FIGS. 3A and 3B, if the delta rpm construction mode 42 is chosen, the delta rpm criterion 50 construction parameter 46 must be selected. The delta rpm criterion 50 is a value representing a change in machine rotations per minute. The delta rpm criterion 50 is used by the graphical tool 14 to select a sample of the vibration data 12 at each instance where the machine speed changes by an amount equal to the delta rpm criterion. Thus, the delta rpm criterion 50 of the delta rpm construction mode 42 serves a similar function as the delta time criterion 48 of the delta time construction mode 40. However, if the fixed number construction mode 44 is selected, the user must enter a fixed number criterion 52. The fixed number criterion 52 is a number indicating to the graphical tool 14 the number of time intervals into which the region of interest 10 should be equally divided.

An additional criterion required for cascade or waterfall plots 20 is a block size parameter 68, which is shown in the settings dialog 36 of FIG. 3A. The block size parameter 68 is used to construct spectral data 70 (FIG. 5) necessary for cascade plotting. Furthermore, for an average shaft centerline plot 34, trend data from two separate, companion monitoring channels—for example 30 and 32 of FIG. 2—is required. The trend data from the two channels must correspond to the same period of time. In alternate embodiments other types of analytical plots requiring additional or different construction parameters 46 may be used. Further, depending on the construction mode 38, in conjunction with the type of analytical plot chosen, specific construction parameters 46 may be necessary. The construction parameters 46 described herein are the minimum necessary construction parameters 46 for using each of the described construction modes 38 and associated analytical plots.

Figure 4A:
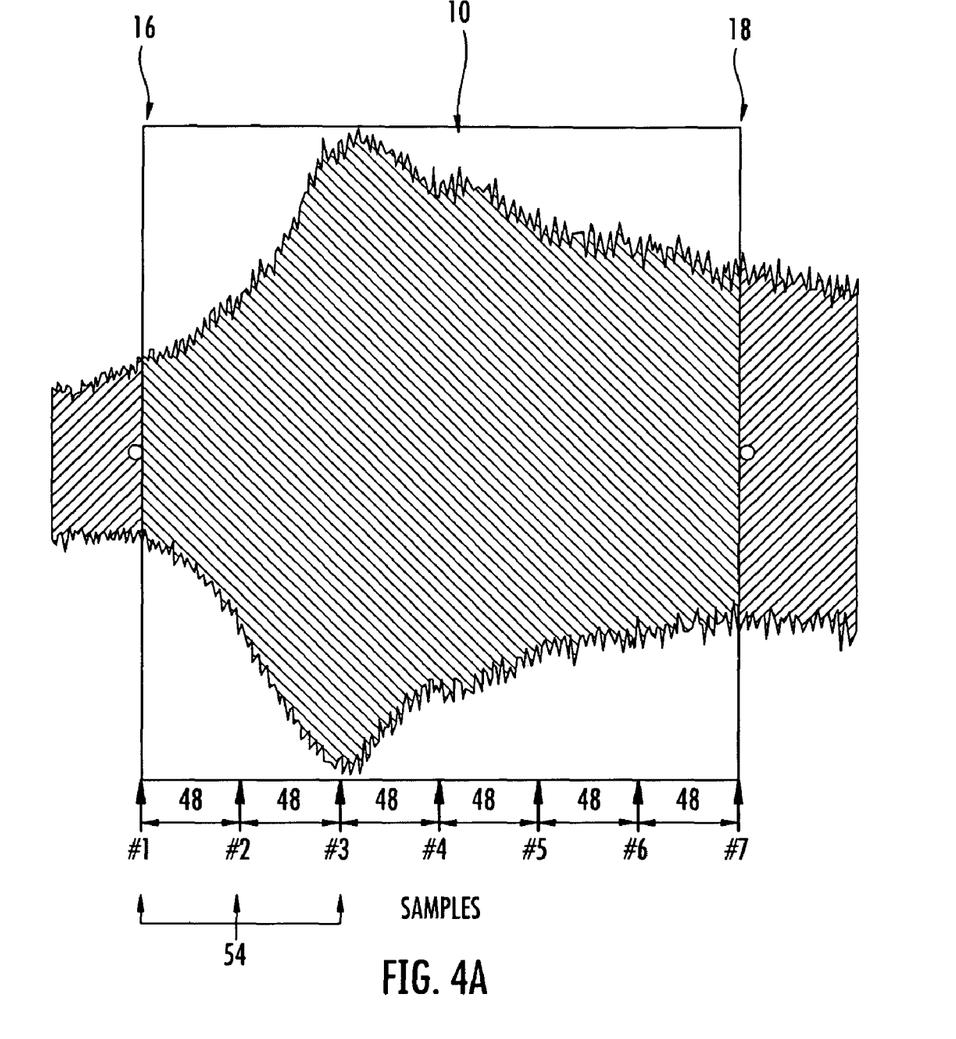
FIG. 4A is a screenshot of a display of an envelope of a region of interest of data showing steps in a delta time construction mode.

Referring now to FIG. 4A, a block of vibration data 12 with a selected region of interest 10 being analyzed with the delta time construction mode 40 is shown. The delta time construction mode 40 requires a delta time criterion 48 as discussed above. As shown in FIG. 4A, each step 54 is spaced apart from the previous step 54 by a time equal to the delta time criterion 48. Thus, in other embodiments of the delta time construction mode 40, a step 54 does not necessarily fall on the trailing edge 18 of the region of interest 10, However, in this exemplary embodiment, a step 54 does fall on the leading edge 16 of the region of interest 10 and each successive step 54 is spaced a distance equal to the delta time criterion 48 from the previous step 54. At the end of each step 54, a block of waveform data 60 and a gross scan DC trend point 62 are used to provide an additional sample used by the graphical tool 14 in deriving a plot.

Figure 4B:
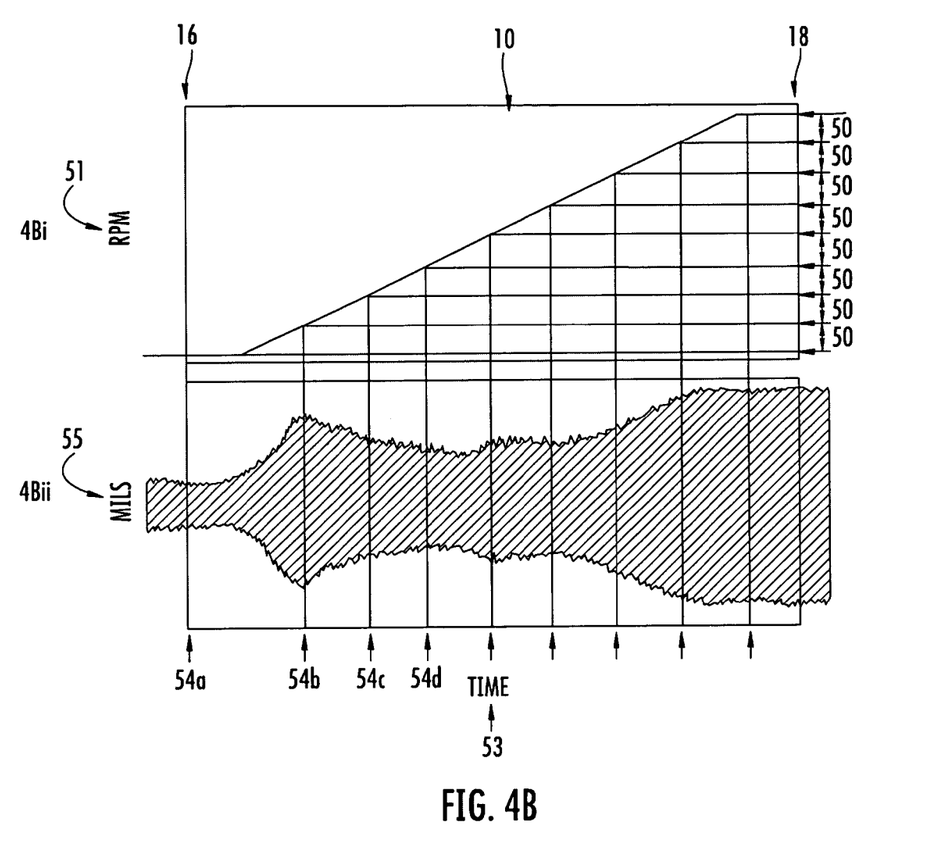
FIG. 4B is a screenshot of a display of an envelope of a region of interest of data showing steps in a delta RPM construction mode.

Referring now to FIG. 4B, a block of vibration data 12 with a selected region of interest 10 being analyzed with the delta rpm construction mode 42 is shown. The delta rpm construction mode 42 requires a delta rpm criterion 50 as discussed above. FIG. 4Bi shows the RPM or the speed of the machine on its y-axis 51 versus time on its x-axis 53. In this example, the RPM of the machine increase at a constant rate and FIG. 4Bi therefore shows a linear curve. In other examples and embodiments, however, the RPM of the machine do not increase at a constant rate and the RPM versus time curve may be very different. FIG. 4Bii shows the vibration amplitude of the machine on its y-axis 55 versus time on its x-axis 53.

In this example many of the steps 54 are equal in time, but in other examples and embodiments, for example those in which the RPM curve is non-linear, the steps may be unequal. In fact, they may be significantly different. In this example step 54a is on the leading edge 16 of the region of interest 10. The region of interest 10 is analyzed through the time domain and when the delta rpm criterion 50 is achieved, a new sample of data for derived plots is taken. The delta rpm criterion 50 is met when the RPM has changed an amount equal to the value of the delta rpm criterion 50 entered by the user. In this example, the RPM has increased by an amount equal to the delta rpm criterion 50 as of the time represented by step 54b. Therefore, at the time associated with step 54b, a data sample is taken. Continuing to move through the vibration data versus time, the RPM has changed an amount equal to the delta rpm criterion 50 next at the time associated with step 54c. Therefore, another data sample is taken. This procedure is continued for the remaining time within the region of interest 10 until the trailing edge 18 of the region of interest 10 is reached.

The RPM or speed of the machine may be determined, for example, by analyzing tachometer data once for every tachometer pulse. This speed is constantly analyzed in order to determine the instant at which the speed has changed an amount equal to the delta rpm criterion as discussed above. At such instant, a data sample is taken for derived plots.

Figure 4C:
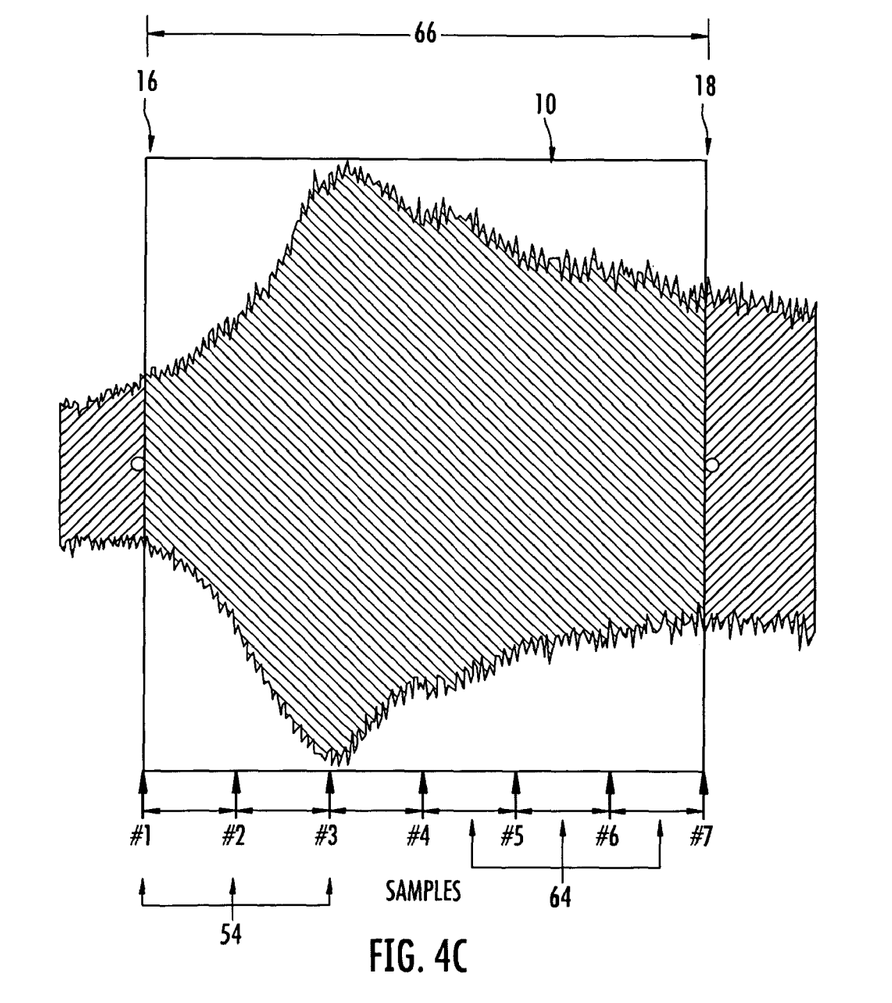
FIG. 4C is a screenshot of a display of an envelope of a region of interest of data showing steps in a fixed number construction mode.

Referring now to FIG. 4C, a block of vibration data 12 with a selected region of interest 10 being analyzed with the fixed number construction mode 44 is shown. The region of interest 10 selected is from the leading edge 16 to the trailing edge 18. The steps 54 shown on the bottom of the figure divide the region of interest 10 into equal sections as described above. In this case, the fixed number criterion 52 is equal to six, that is, the region if interest is divided into six equal divisions of time. In the fixed number construction mode 44, a step 54 will never extend further in time that the trailing edge 18 of the region of interest 10 as was possible with the delta time construction mode 40 and the delta rpm construction mode 42.

The fixed number step duration 64 is the length of time of each step 54 in the fixed number construction mode 44. This value 64 is calculated by determining a region of interest time duration 66, which is the difference of the time associated with the trailing edge 18 and the time associated with the leading edge 16. The fixed number step duration 64 is the region of interest time duration 66 divided by the fixed number criterion 52. In the fixed number construction mode 44 a block of waveform data 60 and a gross scan DC trend point from each step 54 is used to provide an additional sample for each of the derived plots.

Figure 5:
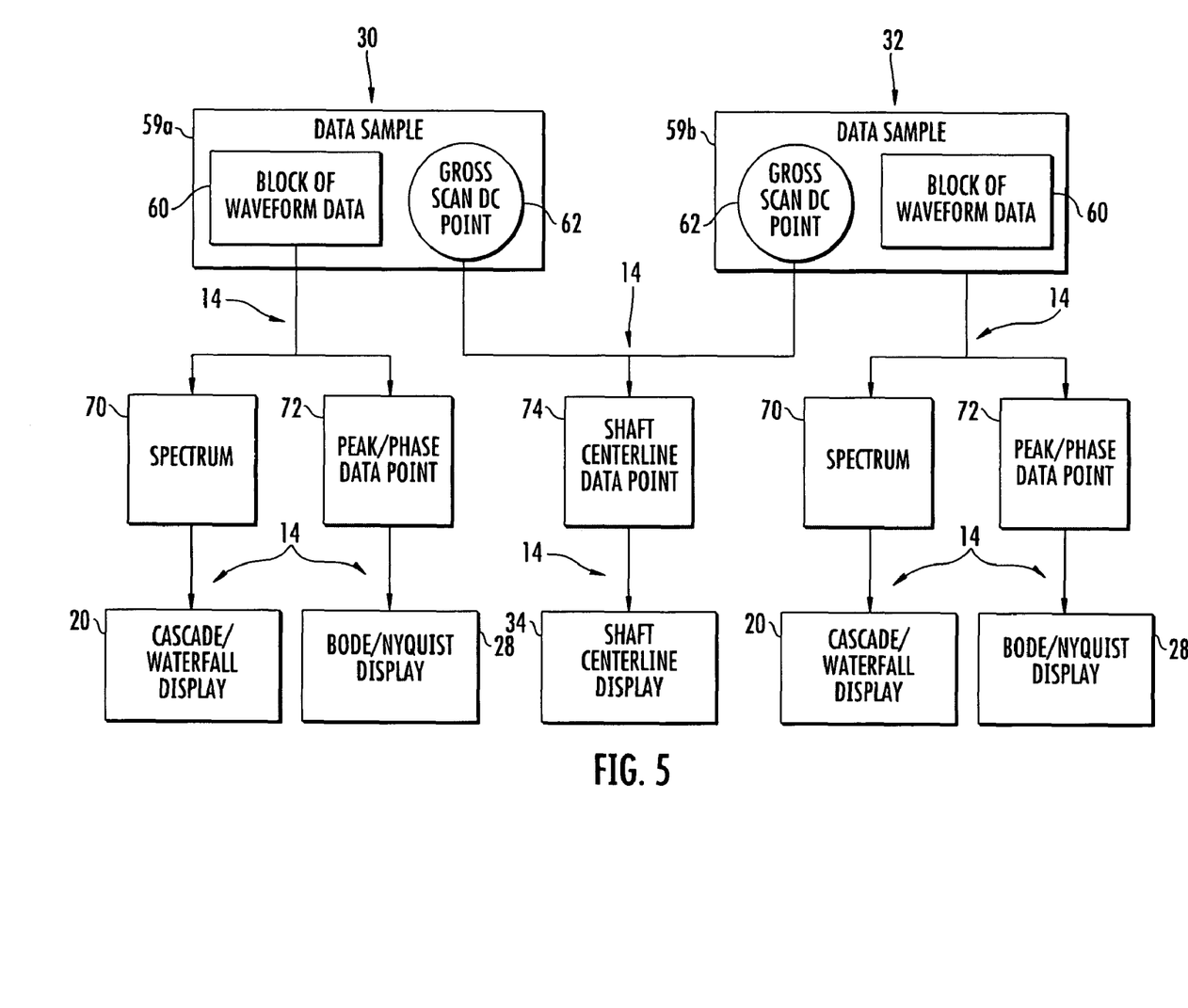
FIG. 5 is a flowchart of graphical tool analysis of data samples from two companion channels.

FIG. 5 shows a flowchart of the progression of data samples 59a and 59b collected from the regions of interest 10 of two, synchronized channels 30 and 32. The arrows in FIG. 5 represent processing steps performed by the graphical tool 14. As illustrated in FIG. 5, the cascade/waterfall plots 20 and the Bode/Nyquist plots 28 may be derived and displayed by use of a single source of vibration data 12 (FIG. 1). However, as discussed above, the average shaft centerline plot 34 requires two, companion sources of vibration data 12, represented in this figure as channels 30 and 32. Regarding the cascade plot 20, as shown in FIG. 1B, the graphical tool 14 first determines spectrum data 70 from a data sample 59a and then populates the cascade plot or display 20 from several spectral data 70. Similarly, the graphical tool 14 first determines a peak/phase data point 72 for each data sample 59 and combines several peak/phase data points 72 to derive a Bode/Nyquist plot or display 28, as shown in FIG. 1C. However, the graphical tool 14 must process two data samples 59a and 59b collected from two, companion channels 30 and 32 to determine a shaft centerline data point 74. Several data points 74 are combined to derive an average shaft centerline plot or display 34.

Referring now to FIG. 6, a schematic diagram of the graphical tool 14 is shown. The graphical tool 14 includes both a hardware module 76 and a software module 78 that interact with one another. The hardware module 76, in one embodiment, includes a processor 84, a memory 86, a display 88, and a communicator 90. Preferably, the communicator 90 communicates with a vibration sensing instrument 92 engaging a machine 94. The machine 94 is the subject of the vibration analysis and the source of the vibration data 12. The vibration sensing instrument 92 is preferably one or more accelerometers and a tachometer but may be any vibration sensing instrument 92. The vibration sensing instrument 92 communicates the vibration data 12 to the communicator 90 of the hardware module 76 preferably in a format where the independent variable is time and the dependent variable is displacement or vibration distance. The vibration data 12 is stored in the memory 86, which is accessed by the processor 84 as directed by the software module 78 of the graphical tool 14.

The software module 78 is preferably stored in the memory 86 of the hardware module 76 and controls the processor 84 of the hardware module 76. In one embodiment, the software module 78 includes plotcontrol module 80 and plotting module 82. Plotcontrol module 80 and plotting module 82 are preferably library files with a ".dll" file extension. Plotcontrol module 80 is a library containing tools represented by the tools module 96 and is used by the plotting module 82. Plotcontrol module 80 also draws the region of interest 10 on the display 88, represented by graphics module 98, allowing the user to resize the region of interest 10, that is, to set the leading edge 16 and the trailing edge 18. This is done by the user making a simple selection such as by mouse, keyboard, or other input commands.

Additionally, movement of the region of interest 10 may be automated so that derived plots 20, 28, and 34, automatically step through time as represented by automation module 102. Plotcontrol module 80 also raises events, represented by the raise events module 100, when the size or position of the region of interest 10 changes such as by user input commands. Plotting module 82 responds to such events, represented by event response module 102, by calculating the data required for populating derived plots 20, 28, and 34. Plotting module 82 also manages the construction modes 38 and construction parameters 46 associated with the region of interest 10 as represented by managing module 104.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for processing and displaying transient data using a graphical tool, wherein the transient data includes one or more portions of a machine performance data set which are indicative of a transient event in a machine, the method comprising:
   a. displaying transient data on a display device of the graphical tool,
   b. receiving an input command indicating a region of interest leading edge and a region of interest trailing edge of a region of interest within the transient data displayed on the display device,
   c. receiving an input command indicating a selection of construction mode, wherein the selected construction mode defines a set of instructions to be executed by a plotting module running on a processor of the graphical tool to determine a plurality of steps at which data samples are to be taken within the region of interest in the transient data,
   d. receiving an input command indicating one or more construction parameters corresponding to the selected construction mode, wherein the construction parameters represent one or more values which maybe used by the plotting module of the graphical tool when following the set of instructions,
   e. executing the plotting module on the processor of the graphical tool to determine the plurality of steps within the region of interest in the transient data based on the set of instructions defined by the construction mode and the one or more construction parameters,
   f. accessing a memory of the graphical tool to take a plurality of samples of data at the corresponding plurality of steps within the region of interest in the transient data, and
   g. processing the plurality of samples in the processor of the graphical tool to produce at least one derived graphical plot for display on a display device.

2. The method of claim 1 wherein the selected construction mode is a delta time construction mode wherein a construction parameter is a time value and wherein step (e) comprises determining the plurality of steps to correspond to time intervals in the region of interest equal to the time value.

3. The method of claim 1 wherein the transient data displayed in step (a) has been collected from a machine rotating at a potentially varying speed and the selected construction mode is a delta RPM (rotations per minute) construction mode wherein a construction parameter is an RPM value and wherein step (e) comprises determining the plurality of steps to correspond to locations in the region of interest where the speed of the machine changes by an amount equal to the RPM value.

4. The method of claim 1 wherein the selected construction mode is a fixed number construction mode wherein a construction parameter is a fixed number and wherein step (e) comprises determining the plurality of steps to equally divide the region of interest in the transient data into a number of time intervals equal to the fixed number.

* * * * *